Patented Feb. 9, 1926.

1,572,814

UNITED STATES PATENT OFFICE.

WILLIAM SCHNEIDERMAN, OF NEW YORK, N. Y.

DETERGENT COMPOSITION.

No Drawing. Application filed May 25, 1923. Serial No. 641,512.

*To all whom it may concern:*

Be it known that I, WILLIAM SCHNEIDERMAN, a citizen of The United States, residing at New York city, in the county of New York and State of New York, have invented new and useful Improvements in Detergent Composition, of which the following is a specification.

The present invention relates to a detergent composition of a consistency resembling that of cream, or somewhat thicker, even approaching that of a paste. The composition is suitable for removing dirt from the hands, and has been found capable of removing not only ordinary dirt, but paint, grease, including black oil and greasy material, such as a mechanic would have on his hands after working on an automobile. It will remove all kinds of grime, also tar and many dyes, and other materials. The composition is non-injurious to the hands, and seems to exercise a healing action on small cuts or bruises or the like.

The soap mixture is composed of a number of ingredients as referred to below, these being mixed in the manner described below, to produce the finished product.

First a soap mixture of cream-like consistency (hereinafter termed "soap cream") is produced, for which operation ¾ of an ounce of caustic soda are dissolved in 2 ounces of water, preferably aiding solution by gentle heating. To this solution is then added a mixture of 2 ounces of cotton seed oil and 1 ounce 2½ drams of rectified spirits of turpentine. The mixture is then stirred repeatedly until a uniform soapy emulsion is formed of the general nature of soap cream having a part of its base replaced by turpentine. The mixture in a suitable receptacle is placed on a water bath and heated, and gently stirring until the desired consistency is obtained, which should be about the consistency of a thick cream. Then a mixture of 1 ounce of alcohol, and 15 grains of ammonium chloride (with a little water, if desired) is preferably added, and the heating continued until the mass begins to foam.

6 ounces of the material prepared as above, after cooling to room temperature is rubbed up with 7 ounces of white petrolatum. Then 6 ounces of spirits of turpentine are added, mixed with 1 ounce of carbon tetrachloride and the mixture well agitated to produce an emulsion. To this is preferably added 5 ounces of glycerine, 15 grains of ammonium chloride, 1 dram of oil of mirbane, and 1 dram of amyl acetate.

The entire mixture is then thoroughly agitated to produce an emulsion which is in the nature of a thick creamy mass.

I have above referred to the use of certain proportions, but I call attention to the fact that the proportions can be varied more or less, without sacrificing the useful properties of the product. The above proportions however, have been found to give most satisfactory results, of any thus far tried.

Oil of mirbane and amyl acetate if used are added to the mixture primarily to produce an agreeable odor and to cover up the soapy odor which otherwise the material would have. Other materials capable of producing this result can be likewise employed.

I claim:

1. A detergent composition comprising about one volume of a soap cream, about an equal volume of turpentine, and a somewhat greater volume of petrolatum, together with a small amount of carbon tetrachloride.

2. A detergent composition comprising a soap cream, containing the reaction products of caustic alkali and cotton seed oil, together with a somewhat greater amount of petrolatum, such detergent composition also containing turpentine and carbon tetrachloride.

3. A detergent composition comprising a soap cream, and spirits of turpentine in about equal amounts, and an amount of petrolatum in greater amount than either of said two materials, also glycerine, carbon tetrachloride, ammonium chloride, and a scenting material.

4. A detergent compound comprising about 6 parts of a soap cream, 7 parts of white petrolatum, 6 parts of spirits of turpentine, 1 part of carbon tetrachloride, and small quantities of glycerine, ammonium chloride, and scenting material.

In testimony whereof I have affixed my signature.

WILLIAM SCHNEIDERMAN.